United States Patent [19]
Williams et al.

[11] Patent Number: 5,981,910
[45] Date of Patent: Nov. 9, 1999

[54] HEATED COVER FOR A FUEL FILTER

[76] Inventors: Wayne Williams; Phyllis Williams, both of P.O. Box 56, Dexter, Mo. 63841

[21] Appl. No.: 08/851,683

[22] Filed: May 6, 1997

[51] Int. Cl.[6] ............................. H05B 3/36; F02M 31/125
[52] U.S. Cl. .......................... 219/386; 219/205; 219/529; 219/549; 392/470; 123/557; 210/186
[58] Field of Search ..................................... 219/205–207, 219/385, 386, 529, 544, 546, 548, 549, 552, 553; 123/543, 545, 557, 142.5 R, 196 AB; 165/46; 210/186; 392/470

[56] References Cited

U.S. PATENT DOCUMENTS

| | | | |
|---|---|---|---|
| 1,455,287 | 5/1923 | Hadley | 219/528 |
| 2,482,665 | 9/1949 | Geyer | 219/529 |
| 2,527,864 | 10/1950 | Weidenschilling | 219/528 |
| 3,657,517 | 4/1972 | Hoyt | 219/528 |
| 3,935,901 | 2/1976 | Virgil . | |
| 4,091,265 | 5/1978 | Richards et al. | 123/557 |
| 4,191,524 | 3/1980 | Thorn | 219/205 |
| 4,321,136 | 3/1982 | Matsui | 210/186 |
| 4,404,949 | 9/1983 | Bell | 123/557 |
| 4,442,819 | 4/1984 | Veach . | |
| 4,477,715 | 10/1984 | Bell et al. | 219/205 |
| 4,498,446 | 2/1985 | Judson . | |
| 4,529,866 | 7/1985 | Leary | 219/205 |
| 4,551,619 | 11/1985 | Lefebvre | 219/544 |
| 4,603,244 | 7/1986 | Genz . | |
| 4,675,503 | 6/1987 | Toivio et al. | 219/205 |
| 4,718,392 | 1/1988 | Pasbrig | 123/557 |
| 4,866,250 | 9/1989 | Pasbrig | 219/205 |
| 4,870,249 | 9/1989 | Kayanuma et al. | 219/206 |
| 4,898,668 | 2/1990 | Hodgkins et al. . | |
| 5,040,517 | 8/1991 | Cox . | |
| 5,436,429 | 7/1995 | Cline | 219/549 |
| 5,615,805 | 4/1997 | Yoncak | 219/521 |
| 5,782,172 | 7/1998 | Schacht | 99/422 |
| 5,786,574 | 7/1998 | Garnett | 219/529 |

*Primary Examiner*—Joseph Pelham
*Attorney, Agent, or Firm*—Polster, Lieder, Woodruff & Lucchesi

[57] ABSTRACT

A heated thermal filter cover maintains a fluid filter, and fluid within the filter, above a gelling temperature of the fluid. The filter cover includes a soft or flexible receptacle which is generally circular in top plan and an electrical resistance wire. The receptacle includes a circular wall and a bottom which define an upwardly opening chamber sized to receive the filter. A resistance wire is placed inside the chamber, preferably at the bottom of the chamber and adjacent the inner surface of the wall. Lead wires connect the resistance wire to a source of electricity, such as the electrical system of a truck or a battery. The wall and bottom of the receptacle are both made of two plies of fleece coated fabric, the two plies being assembled together so that the fleece surfaces face each other so that the wall and bottom of the receptacle will insulate the chamber. The outer ply is preferably a fleece backed vinyl and the inner ply is preferably a thermal fleece. The receptacle is closed by a draw string at the top of the wall. The resistance wire draws only about 0.7–1.1 amps to allow the filter cover to be operated for long periods of time without the engine operating and without substantially draining the battery.

16 Claims, 1 Drawing Sheet

HEATED COVER FOR A FUEL FILTER

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates to filter heaters, and in particular, to a heated thermal filter cover for use with fluids, such as diesel fuel, oil, and hydraulic fluids, which gel at temperatures of less then 32° F. Although the invention will be described primarily with respect to trucks which use diesel fuel, it will be apparent to those skilled in the art that the invention has broader applications.

The fuel filters for diesel engines of trucks, for example, are often outside the truck's engine compartment. The filter, therefore, is subjected to the ambient atmosphere. When it gets cold, e.g., less than 0° F., the filter will get cold, and the diesel fuel, which is not heated, will gel in the filter. When the fuel gels in the filter, fuel cannot pass through the filter, and thus, fuel will not reach the engine. The engine, therefore, will stall or the operator will be unable to start the engine. When fuel gels in the filter, the only recourse for the operator is to pull the truck over to the side of the road and replace the fuel filter. If the operator does not have a spare fuel filter with him, he must wait for a new filter to be delivered. As can be appreciated, either of these options takes a considerable amount of time. Further, the gelling of fuel in the filter requires a filter to be replaced prematurely, i.e., before it would otherwise not have to be replaced. Both the time spent replacing the filter and the cost of the new filter increase the cost of transporting goods over the road.

Many have attempted to develop filter heaters to prevent fuels from gelling in filters. Most of these filter heaters, however, are complicated and expensive to build, and difficult to install. For example, there are several filter heaters which use heated cooling fluid from the engine to maintain the filter, and the fuel in the filter, above the fuel's gelling temperature. Such filter heaters are difficult to install because they must be interconnected with the engine's cooling system.

Other filter heaters are electrical. Although it is easier to connect the heater to the engine's electrical system than to the cooling system, the electrical heaters are difficult to install over the filter. Hence, they are also difficult to remove from the filter to change the filter. As can be appreciated, a heater which is difficult to remove and install only makes the changing of the filter more difficult and time consuming. Fuel filters must be replaced every 20,000–30,000 miles in trucks. In many trucking operations, this distance is traveled very quickly (i.e., in a month or less). In filter heaters that are difficult to install and to remove from the filter, the time wasted because of the difficulty in changing the fuel filter will add up quickly.

BRIEF SUMMARY OF THE INVENTION

A primary object of the present invention is to provide a heated thermal filter cover which will maintain the fluid in a filter above its gelling temperature.

Another object is to provide such a filter cover which will insulate the filter so that the heat will not be quickly lost to the atmosphere.

Another object is to provide such a filter cover which is easy to install on a filter.

Another object is to provide such a filter cover which may be easily removed from the filter to allow the filter to be changed.

Another object is to provide such a filter cover which draws only a small amount of current, so that the heated thermal filter cover can be operated even when the engine is off, without fear of draining the battery which powers the filter cover.

These and other objects will become apparent to those skilled in the art upon a review of the following disclosure and accompanying drawings.

Briefly stated, a heated thermal filter cover of the present invention includes a soft or flexible receptacle which is generally circular in top plan and includes a circular wall and a bottom which define an upwardly opening chamber sized to receive a commercially available filter, such as the fuel filter for a diesel truck or the fluid filter for hydraulic machinery. A resistance wire is placed inside the chamber, preferably at the bottom of the chamber and adjacent the inner surface of the wall. Lead wires connect the resistance wire to a source of electricity, such as the electrical system of a truck or a battery.

The wall and bottom of the receptacle are both made of pliable and insulating material. Preferably, the wall and bottom are made of two plies of fabric, each of which has a fleece coated surface. The two plies are connected together such that the fleece of the two plies face each other. The outer ply is preferably a fleece backed vinyl and the inner ply is preferably a thermal fleece. By placing the fleece coating of the two plies together, the wall is provided with good insulation to prevent heat from the resistance wires from escaping the chamber.

A tightener is provided at top of the receptacle to tighten the receptacle around the filter to hold the filter cover to the filter. The tightener comprises a draw string, and the receptacle has a channel at its top through which the draw string is threaded.

Preferably, the resistance wire draws only about 0.7–1.1 amps. This will allow the filter cover to be operated for long periods of time without the engine being operating and without draining the battery. This will allow the engine to be started after long periods of use of the filter cover. The filter cover may also be provided with a thermocouple which would be positioned in the chamber to cycle the flow of electricity to the filter cover to reduce the amount of energy actually used by the filter cover. A switch may also be provided to allow for the flow of current to the filter cover to be selectively opened and closed. A vent hole can be placed in the bottom of the filter cover to allow any moisture which condenses inside the filter cover to escape. The hole is sized to permit the condensation to escape the filter cover, but to substantially prevent water from entering the filter cover. Because the filter cover is made of a flexible material, the hole is held opened by a grommet or some similar means.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
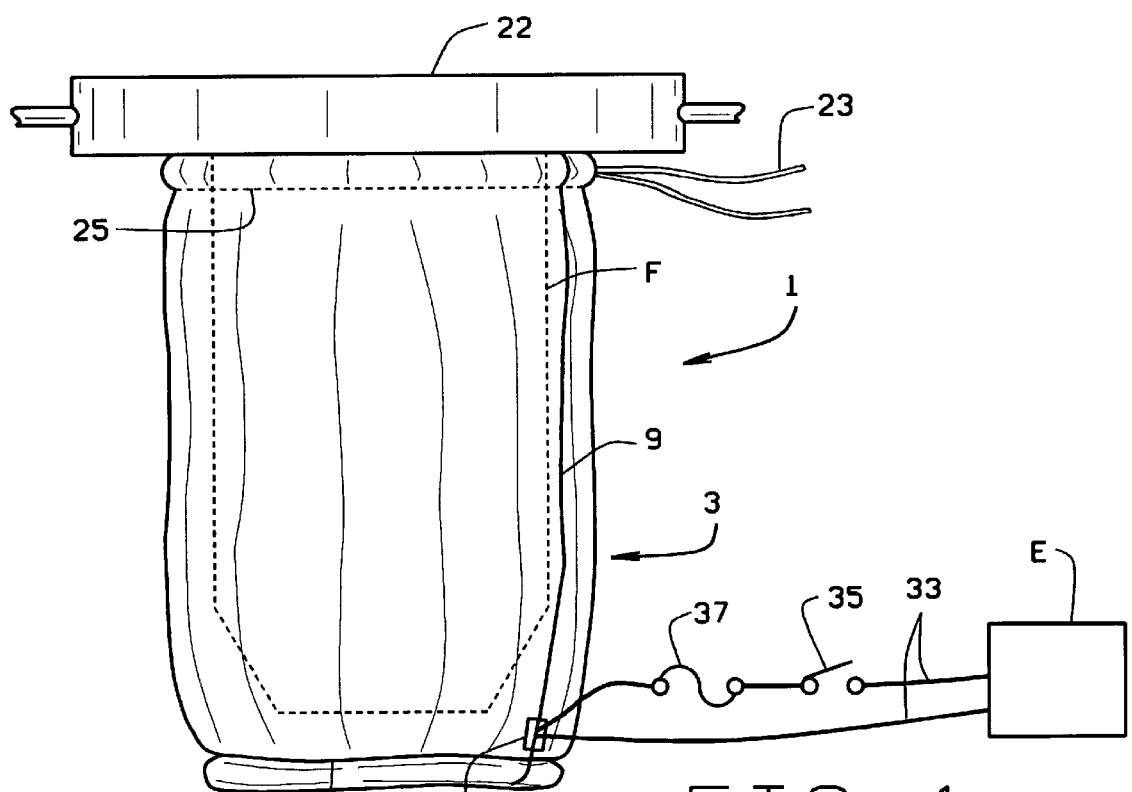
FIG. 1 is a side elevational view of an insulated heated thermal filter cover of the present invention, a filter being shown in phantom in the heated thermal filter cover.
Figure 2:
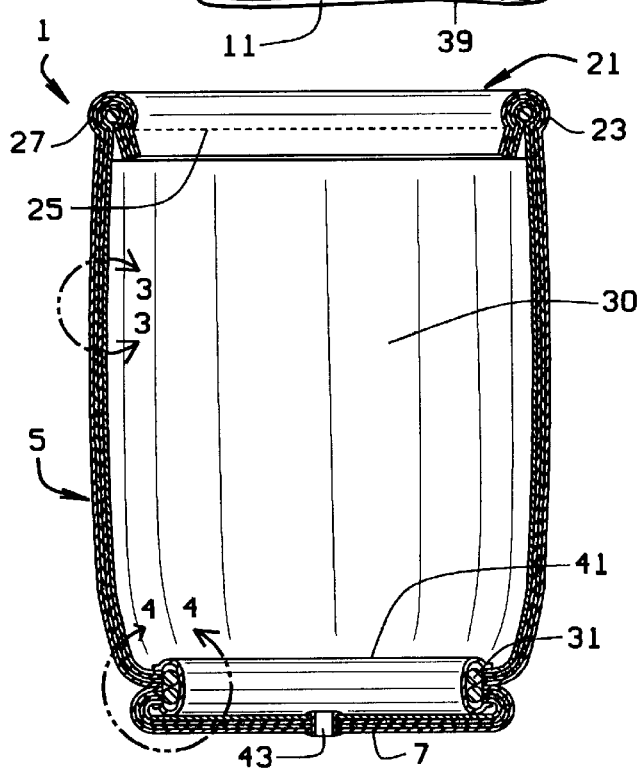
FIG. 2 is a cross-sectional view of the filter cover.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Although the filter cover is described for use with fuel filters (e.g. fuel filters for diesel engines) those skilled in the art will recognize that it is equally applicable for filters for fluids such as hydraulic fluids, and other operating fluids which, when exposed to cold weather will not function properly due to freezing or gelling of the fluid.

A heated thermal filter cover 1 of the present invention comprises a soft-sided receptacle 3 sized to received a filter F, such as a fuel filter for a diesel engine, a filter for hydraulic fluid, etc. The receptacle 3 includes a side wall 5 which is preferably circular in top plan and a bottom or floor 7. The wall 5 is preferably continuous and the opposite ends of the material which makes the wall 5 is joined together along a seam 9 which extends the height of the wall 5. The wall 5 and bottom 7 are joined together along a seam 11 which extends around the circumference of the filter cover bottom 7.

Figure 3:
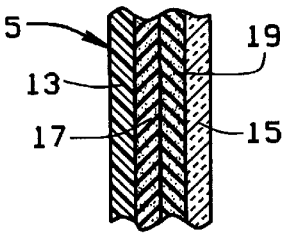
FIG. 3 is an enlarged view taken along line 3—3 of FIG. 2.

The wall 5 and bottom 7 are preferably each made of two plies of material: an outer ply 13 and an inner ply 15. The outer ply 13 of both the wall 5 and bottom 7 is preferably made from vinyl and has a fleece backing 17. The inner ply 15 of both the wall 5 and bottom 7 is made of an insulating material having a fleece backing 19. The inner and outer plies 13 and 15 are assembled together so that their respective fleece backings 17 and 19 are in contact with each other, as best seen in FIG. 3. This configuration of the two plies creates a thermal barrier which will reduce the loss of the heat generated by the filter cover to the atmosphere.

The heated thermal filter cover 1 is opened at its top 21. The top 21 and wall 5 are slightly larger in circumference than the filter F so that the filter cover 1 may be easily slid over the filter F. The side 5 of the filter cover 1 is sized to extend the full length of the filter so that the entire filter is enclosed by the filter cover. As seen in FIG. 1, when the filter cover is applied to a filter, the top of the filter cover is positioned against the bottom of the cover 22 to which the filter is mounted. A draw string 23 is provided to close the top 1 around the filter. The wall 5 is folded over and sewn along a third seam 25 to form a channel through 27 which the draw string is threaded. Thus, when the filter cover 1 is slid over a filter F, the draw string need only to be tightened about the filter to secure the filter cover 1 in place about the filter. When the heated thermal filter cover 1 is closed about the filter, the filter cover and filter cooperate to form a closed chamber 30 which is heated, as will be discussed below.

As can be appreciated, the two plies 13 and 15 of the wall 5 and bottom 7 are sewn together along the seams 9, 11, and 25. Thus, the seams 9 and 11 serve a two fold purpose—they form the material into the heated thermal filter cover and they hold the two plies of the wall and bottom together.

To heat the filter F, the filter cover 1 includes a resistance wire 31 which is operatively connected to the electrical system E of the engine or machine of which the filter is a part by electrical wires 33. Thus, the resistance wires 31, the lead wires 33 form an electrical circuit with the electrical system E of the engine. The wires 31 and 33 preferably enter the heated thermal filter cover 1 through the seam 9 to avoid the need to make an additional hole in the wall 5 for the wire to enter the chamber 30. If desired, a switch 35 and/or fuse 37 may be placed in the wires 33. A thermocouple 39 can optionally be positioned in the chamber to cycle the resistance wires 31 on and off, so that the filter cover will only be activated when needed.

The resistance wire 31 is positioned within the chamber 30, rather than within the wall 5, so that the insulating properties of the wall 5 and bottom 7 do not interfere with heating of the filter F. Preferably, the wires 31 extend around the inner circumference of the wall 5 at the bottom of the wall. Further, the wires 31 preferably are wrapped about the inner circumference of the receptacle twice. Because the wall 5 and bottom 7 have good insulating properties, the wire heats up the whole chamber when the filter cover is applied to and closed around a filter F. Thus, even though the wires are positioned only at the bottom of the chamber, the entire filter is heated. Further, this positioning of the resistance wire 31 concentrates the wires around the bottom of the filter. As is known, water often collects in the bottom of filter. Thus, this placement of the resistance wires 31 will concentrate the heat output by the wires near where the water will collect to prevent freezing of the water.

Figure 4:
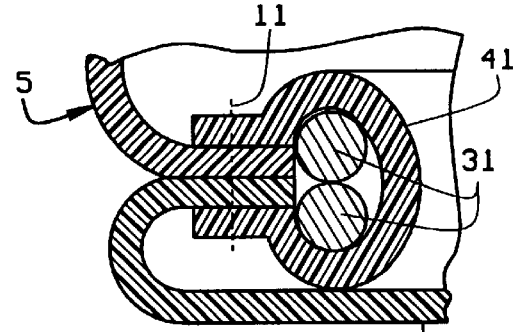
FIG. 4 is an enlarged schematic sectional view taken along line 4—4 of FIG. 2.

To maintain the wires 31 in place in the chamber 30, the wires 31 are preferably wrapped in heat resistant material 41. The material 41 is sewn into the seam 11, as shown in FIG. 4, to form a tube which holds the wires 31 in place at the bottom of the filter cover 1. By forming a tube from the material 41, the resistance wires 31 will be maintained substantially in place in the filter cover 1 and will not be free to move relative to the filter or the wall 5 or bottom 7.

To use the heated thermal filter cover 1, the filter cover is simply slid up around the filter F and tightened about the filter F. If the switch 35 is installed, the switch is operated to close the circuit so that the wires 31 will warm up the filter F. Preferably, the lead wires 33 are long enough so that there is sufficient slack for the filter cover 1 to be removed from the filter, to allow for the filter can be changed without undue difficulty. When the filter F has to be changed, the filter cover 1 can easily be removed from the filter. The draw string 23 is simply loosened sufficiently to allow loosen the grip of the filter cover 1 on the filter. The filter cover 1 may then be easily slid off the filter. When the filter has been replaced with a new filter, the filter cover 1 is simply slid over the new filter, and the draw string is tightened to secure the filter cover about the filter. Because there is sufficient slack in the wires 33, the filter cover 1 can remain connected to the electrical system while the filter is changed.

The resistance wires 31 preferably only warm up the filter to slightly above the freezing point of water (32° F. (0° C.)). Preferably, the filter is heated to between about 32° F. (0° C.) and about 40° F. (4.5° C.). This temperature will keep the fuel or fluid which flows through the filter from gelling or freezing. By operating the filter cover to heat the filter to slightly above the freezing point, the amount of current needed to heat the filter is reduced. Further, because the wall 5 and bottom 7 are made of insulating material, the heat generated by the resistance wire 31 is not quickly lost to the atmosphere. Rather, the heat will remain in the chamber to warm the filter F.

Preferably, the wires 31 draw between 0.7 and 1.1 amps, and preferably about 0.8 amps, and can be powered by a 12 V battery. This amount of current is sufficiently small so that the filter cover can be run continuously, even when the engine or machine is not in operation, without wearing down the battery which is part of the electrical system of the engine or machine. Thus, even after a long period of use of the heated thermal filter cover 1, the battery will still have enough power to start the engine. If the thermocouple 39 is provided, the thermocouple will cycle the resistance wires on and off. This will reduce even further the amount of energy which is drawn from the battery, to allow the filter cover to be operated for a longer amount of time without wearing down the battery.

Because some ambient air may enter the filter cover, moisture may accumulate inside the filter cover 1. Therefore, the filter cover 1 can be provided with a small opening 43 in the bottom 7 of the filter cover. The opening 43 is preferably small, so that water can exit the filter cover, but it will substantially prevent water from entering the chamber 30 from the outside of the filter cover 1. Heated air rises. Thus, very little, if any, of the air heated by the resistance wire 31 will escape out the moisture vent 43. In the situation, as here, wherein the filter cover is made from insulating fabrics, the hole can be maintained open by the use of a small grommet or the like.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, the draw string 23 could be replaced with hook-and-pile members on the outer surface of the filter cover to close the filter cover about the filter. Other means, such as snaps could also be provided to close the filter cover about the filter. The position of the resistance wires could be altered. The filter cover could be formed from a different materials, as long as they are insulating materials, and as long as at least a top portion of the cover is flexible or pliable to allow for the top portion of the cover to be tightened around the filter to hold the cover to the filter. The bottom 7 of the filter cover could be removed and the wall 5 could be seamed together along its bottom edge to form the receptacle 3. The tube 41 which maintains the wire 31 in place in the chamber 30 could be replaced with clips or loops of thread or material which will serve to hold the wire in place in the chamber. These examples are merely illustrative.

We claim:

1. A heated thermal filter cover for maintaining a filter and fluid in the filter above a gelling point of the fluid, the heated thermal filter cover including:

a receptacle sized to recive the filter and being made of an insulating material, the receptacle including a side wall and a bottom defining a chamber which is open at its top, at least an upper portion of the receptacle being pliable, the bottom and side wall having an inner surface; the receptacle being made from an outer ply of fabric and an inner ply of fabric which are connected together, each said ply of fabric having a layer of insulating material and a backing layer, the two plies being connected together such that the insulating layer of each ply face each other;

a tightener at the top of the receptacle to tighten the top of the receptacle around the filter;

an electrical resistance wire positioned adjacent the inner surface of the side wall to be inside of the chamber; and a pair lead wires connected to the resistance wire, the lead wires being connectable to a source of electricity.

2. The heated thermal filter cover of claim 1 wherein the layer of insulating material comprises a fleece layer on each ply.

3. The heated thermal filter cover of claim 2 wherein the outer ply comprises fleece backed vinyl and the inner ply comprises thermal fleece.

4. The heated thermal filter cover of claim 1 wherein the resistance wire is positioned near a bottom of the chamber.

5. The heated thermal filter cover of claim 1 including a covering which encases the resistance wire; the covering being adjacent the inner surface of the receptacle side wall.

6. The heated thermal filter cover of claim 5 wherein the resistance wire extends around the inner circumference of the receptacle, to be adjacent an inner surface of the receptacle.

7. The heated thermal filter cover of claim 1 wherein the tightener comprises a draw string, the receptacle including a channel at its top through which the draw string is threaded.

8. The heated thermal filter cover of claim 1 wherein the resistance wire draws approximately 0.7–1.1 amps.

9. The heated thermal filter cover of claim 1 including a thermocouple, said thermocouple being positioned in said chamber.

10. The heated thermal filter cover of claim 1 wherein the bottom of the filter cover includes a hole sized to allow moisture which may collect inside the filter cover to exit the filter cover, yet substantially prevent water from entering the filter cover through the hole.

11. The heated thermal filter cover of claim 1 wherein the hole in the bottom of the filter cover is maintained open with a grommet.

12. A heated thermal filter cover for maintaining a filter and fluid in the filter above a gelling point of the fluid, the heated thermal filter cover including:

a receptacle sized to receive the filter and being made of a flexible insulating material, the receptacle defining an upwardly opening chamber; the receptacle being made from an outer ply of fabric and an inner ply of fabric which are connected together, each said ply of fabric having a fleece surface and a backing surface, the two plies being connected together such that the fleece surface of each ply face each other;

a tightener at the top of the receptacle to tighten the top of the receptacle around the filter;

an electrical resistance wire inside of the chamber, the electrical resistance wire extending around the circumference of an inner surface of said receptacle;

a covering for maintaining said resistance wire in place in said chamber, said covering being adjacent an inner surface of the side wall of the receptacle and defining a tube within the chamber through which the resistance wire extends;

a pair lead wires connected to the resistance wire, the lead wires being connectable to a source of electricity.

13. The heated thermal filter cover of claim 12 wherein the resistance wire is positioned near a bottom of the chamber.

14. The heated thermal filter cover of claim 12 wherein said tube is made of a heat resistant material.

15. The heated thermal filter cover of claim 12 wherein the resistance wire draws approximately 0.7–1.1 amps.

16. The heated thermal filter cover of claim 12 wherein the source of electricity comprises a battery associated with the machine in which the filter is placed.

* * * * *